United States Patent [19]

Norris

[11] 4,310,240

[45] Jan. 12, 1982

[54] PHOTOGRAPHIC APPARATUS WITH MOVABLE LENS

[75] Inventor: Philip R. Norris, North Reading, Mass.

[73] Assignee: Polaroid Corporation, Cambridge, Mass.

[21] Appl. No.: 88,766

[22] Filed: Oct. 29, 1979

[51] Int. Cl.³ .............................................. G03B 27/44
[52] U.S. Cl. .................................. 355/54; 353/27 R; 354/123
[58] Field of Search ........................... 355/53, 54, 77; 354/111, 112, 123, 76; 353/27 R

[56] References Cited

U.S. PATENT DOCUMENTS

| | | | |
|---|---|---|---|
| 1,892,683 | 1/1933 | Robertson | 355/54 |
| 2,660,920 | 12/1953 | McChesney | 353/27 R |
| 3,469,912 | 9/1969 | Wick | 355/18 |
| 3,494,270 | 2/1970 | Shibata | 354/112 |
| 3,503,317 | 3/1970 | Johnson | 354/123 |
| 3,667,364 | 6/1972 | Mann | 355/53 X |
| 4,027,315 | 5/1977 | Barney | 354/76 |
| 4,140,381 | 2/1979 | Douglas | 354/111 |

OTHER PUBLICATIONS

The Focal Encyclopedia of Photography, vol. 1, "Camera Movements", pp. 147-151.

Primary Examiner—Richard A. Wintercorn
Attorney, Agent, or Firm—John S. Vale

[57] ABSTRACT

A photographic apparatus, suitable for use in a low cost microfiche system, for exposing a plurality of image areas on a single card-like film unit, preferably of the self-developing type. The apparatus has a fixed object plane, where documents to be copied are supported; a fixed film plane spaced from the object plane; a laterally extending row of gate apertures for defining a row of image areas on a film unit at the film plane and a system for advancing a lens laterally over the gate areas in increments which locate the lens at successive imaging positions in imaging relation with a corresponding one of the image areas. At those imaging positions that correspond to an image area which is laterally offset with respect to the object plane center the lens is proportionally offset with respect to the image area center so that an image formed by the lens of an object centered at the object plane is centered with respect to the image areas. At each of the imaging positions proper registration of the image is achieved by locating the rear nodal point of the lens on a direct line extending between the object plane center and the center of a corresponding one of the image areas.

8 Claims, 11 Drawing Figures

PHOTOGRAPHIC APPARATUS WITH MOVABLE LENS

BACKGROUND OF THE INVENTION

The present invention relates to the field of photography and, more specifically, to photographic apparatus for exposing a plurality of image areas on a single card-like film unit.

Commonly-assigned copending applications U.S. Ser. Nos. 071,939; 071,940 (now U.S. Pat. No. 4,235,545); and 072,051 (now U.S. Pat. No. 4,235,543), all filed on Sept. 4, 1979, describe and claim various aspects of a microfiche system for sequentially recording micro images of a plurality of different documents on a single card-like film unit, preferably of the self-developing type, and, after film processing, for projecting enlarged images of the documents from the film into a viewing screen.

The system comprises a camera, projector and a console having a combination document mounting and viewing screen area and a mount for alternatively receiving the camera or projector.

In the recording mode the camera is located in the mount and documents to be copied are successively supported on a mounting glass. The camera includes a scanning lens system for incrementally advancing the lens laterally along a portion of the film to successive imaging positions for exposing a row of image areas thereon. After each row is exposed, the film unit is advanced longitudinally one row position in preparation for exposing the next row of image areas. After all the image areas are exposed, the film unit is advanced between a pair of pressure rollers for processing.

To convert the system to the viewing mode, the mounting glass is covered with a viewing screen and the camera is replaced by the projector which is operative to project an enlarged image of any document recorded on the film unit onto the viewing screen.

The present invention is directed to the structure and operation of an imaging system that may be used during the recording mode of operation of such a microfiche system and more particularly to means for automatically advancing the lens in increments to accurately center an image of a document, supported at the mounting glass, with respect to each of the image areas in the row.

Multiple image cameras are well known in the prior art. One type utilizes a fixed lens and mounts the film unit for movement relative thereto to present successive portions of the film unit at an exposure position in direct alignment with the lens. The advantage of such a system is that the lens remains aligned with the subject or a fixed object plane. The disadvantage, however, is that the back of the camera must be much larger than the size of the film to accomodate such film movement. For examples of such cameras see U.S. Pat. Nos. 2,660,920 and 3,667,364.

Another type of camera utilizes a fixed film plane and mounts the lens for movement relative thereto.

For examples, see U.S. Pat. Nos. 3,503,317; 4,027,315 and 4,140,381.

Generally, these cameras are used in photographic situations where the subject is relatively far away and/or does not fill the entire image area on the film so that the shift of the lens relative to the film plane is not noticeable.

However, when the subject is close, the shift in lens position causes a significant shift of the image with respect to the film plane and the image may not lie in the desired image area.

For example, U.S. Pat. No. 1,892,683 describes a graphic arts camera having a movable lens. The camera is used to photograph objects mounted on a copy stand at a relatively short distance therefrom. To compensate for the shift in image position due to lens movement, the object location is moved on the copy stand so that the object is always aligned with the lens.

In the microfiche system described earlier, the object to be photographed (a document) is mounted and centered at a fixed object plane which is relatively close to the camera lens. It is intended that an image of the document fill the entire image area for most efficient use of the film. When the lens is moved to a position that is offset with respect to the object plane center and is centered with respect to a corresponding image area the resultant image is shifted and does not lie entirely within the image area.

This problem is well known in the photographic art and is most prevalent in photographing large objects such as buildings. Because the camera is at ground level and not aligned with the center of the building, the entire building generally does not fall within the camera field of view unless the camera is tilted upwardly. This in turn sets the film plane in non-parallel relation to the object plane and will by necessity cause perspective distortion. However, this problem may be overcome by using a camera having a rising and/or cross front in which the film plane is set parallel to the object plane and the lens is shifted off axis with respect to the film plane to center the image thereon. This technique also may be used to make stereoscopic photographs of large objects wherein the lens is shifted relative to the film plane at off axis camera locations as suggested in U.S. Pat. No. 3,494,270.

On the one hand, providing a multiple image camera with a lens that moves relative to the film plane (at least in one direction to photograph a row or column) allows the camera to be made in a more compact manner than if the camera is configured to have its film plane shifted both horizontally and vertically. On the other hand, however, the movable lens may cause image shift problems in those applications where the object is close at hand and the image is intended to fill the entire image area unless suitable corrections are made.

Therefore, it is an object of the present invention to provide a photographic apparatus for exposing a plurality of image areas on a single card-like film unit wherein the lens is automatically moved in increments relative to the center of a fixed object plane to compensate for image shift such that the image of an object centered at the object plane is centered with respect to corresponding image areas at the film plane.

It is another object to provide such a photographic apparatus that is simple in construction and is suitable for use in a low cost microfiche system.

It is another object of the invention to provide a multiple image photographic apparatus having a lens that is movable relative to the film plane and means for automatically advancing the lens relative thereto in predetermined increments to center the image provided by the lens with respect to both aligned and offset image areas.

Other objects of the invention will, in part, be obvious and will, in part, appear hereinafter.

SUMMARY OF THE INVENTION

The present invention provides a photographic apparatus for exposing a plurality of image areas on a single card-like film unit and is suitable for use in a low cost microfiche system.

In the illustrated embodiment the apparatus takes the form of a microfiche camera including structure for locating such a film unit at a film plane and a console, mounting the camera, for defining an object plane in opposed spaced relation to the film plane where a document to be photographed is located.

In addition to structure for defining the film and object planes, the apparatus further includes a plurality of framing gate apertures for defining a plurality of separate image areas arranged in a row on the film unit at the film plane; a lens for forming an image; structure for mounting the lens for movement along a path of travel over the gate apertures and means for exposing an image area.

To compensate for the earlier noted image shift problem associated with a lens mounted for movement relative to the object and film planes, the apparatus also includes structure for automatically advancing the lens in increments which locate the lens at successive imaging positions whereat the lens is offset from the center of each respective image area, not directly aligned with the object plane center, by a sufficient distance so that an image formed by the lens of an object centered at the object plane is centered with respect to each nonaligned image area as well as an aligned image area.

In so advancing the lens, it is moved through increments that are generally less that the distance between centers of adjacent equally spaced image areas. Also when the lens is at its correct imaging position, the rear nodal point of the lens lies on a direct line that extends between the object plane center and the center of a corresponding one of the image areas.

The illustrated embodiment of the apparatus utilizes a carriage for mounting the lens for movement along its path of travel and the lens advancing structure includes a rotatable barrel cam that move the carriage through successive increments to locate the lens at each of its imaging positions.

When one of the image areas in the row has its center aligned with the object plane center, the cam is configured to align the lens with the center of the one image area and to locate the lens in offset relation with respect to the centers of the other image areas in the row. The distance the lens is offset from an image area center is directly proportional to the distance the image area is offset with respect to the object plane center.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
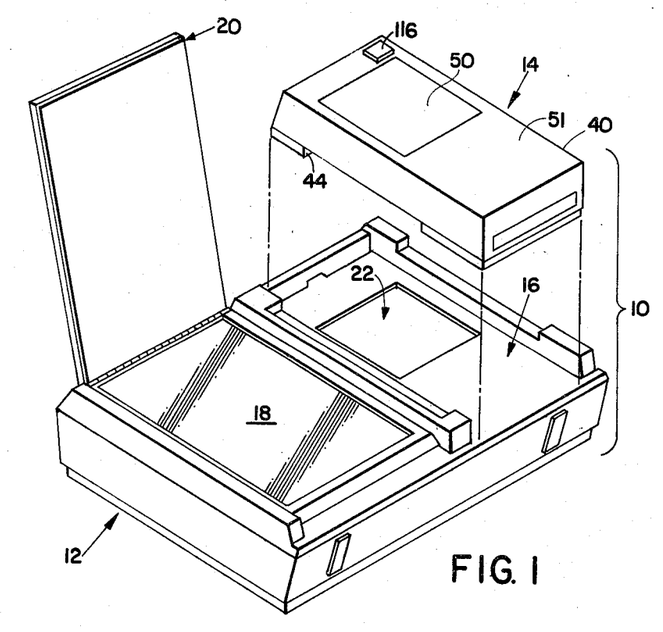
FIG. 1 is an exploded perspective view of a camera and console forming a photographic apparatus embodying the present invention.
Figure 2:
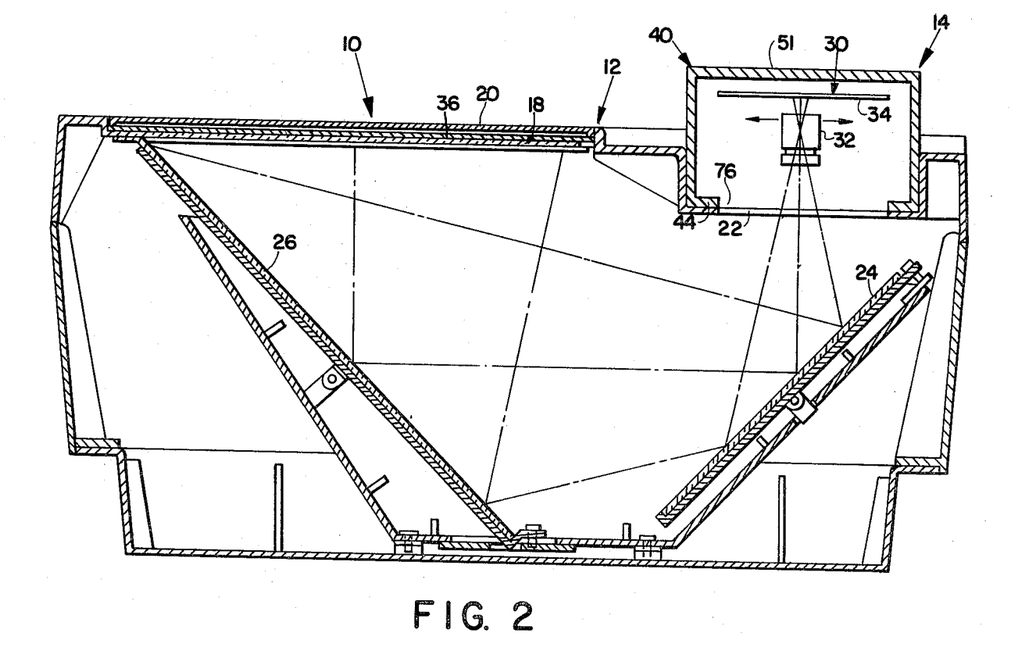
FIG. 2 is a cross-sectional view of the apparatus of FIG. 1 showing the camera mounted on the console.

As shown in FIGS. 1 and 2, a photographic apparatus 10 embodying the present invention is formed by components of a microfiche system including a console 12 and a scanning microfiche camera 14.

Console 12 includes a box-like housing having on its upper surface a camera mount 16 and an adjacent document mounting area defined by a document supporting glass 18 and a hinged cover 20.

Camera mount 16 is a well-like structure for releasably receiving the forward portion of camera 14 and includes a light transmission aperture 22 that is aligned with a later-to-be-described camera lens and strobe lighting unit when camera 14 is operatively located on mount 16.

The console 12 further includes reflective means in the form of a pair of internally mounted angled mirrors 24 and 26 for defining a folded optical path for the transmission of light between the document mounting area and aperture 22.

Figure 8:
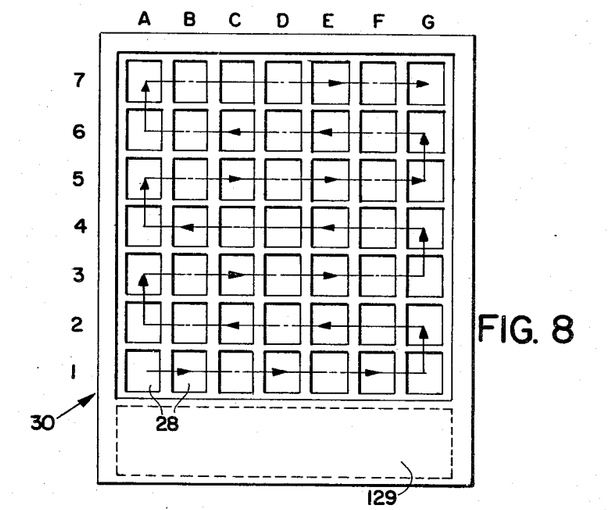
FIG. 8 is a plan view of a self-developing film unit configured for use in the camera and diagrammatically shown thereon a plurality of image areas and the sequence in which they are exposed.

As most clearly shown in FIG. 8, apparatus 10 is configured to exposure a plurality of micro image areas 28 arranged orthogonally in linear columns and rows on a single card-like film unit 30 which is preferably of the integral self-developing transparency type described in commonly assigned U.S. Pat. No. 3,721,562.

In order for camera 14 to expose the image areas 28 in the sequence shown by the arrows in FIG. 8, the camera objective lens 32 is mounted for lateral movement in steps relative to the film plane 34 in response to each actuation of camera 14 to expose a row of image areas 28 with latent images of successive documents supported on glass 18. After the last exposure in the row, a later-to-be-described film advancing mechanism advances film unit 30, longitudinally, one row position and then the lens 32 is advanced in the opposite direction to expose the next row of image areas 28. After the last image area 28 is exposed, the film unit 30 is advanced between a pair of later-to-be-described pressure applying rollers for processing in a well-known manner.

After film processing, the microfiche system may be converted from its recording mode to a viewing mode by removing camera 14 from mount 16 and replacing it with a projector (not shown). The projector includes a self-contained light source and projects an enlarged image of a micro-image frame area onto a translucent viewing screen (not shown) placed over glass 18. For a detailed description of the microfiche system and its components, reference may be had to commonly-assigned copending applications U.S. Ser. Nos. 071,939; 071,940; and 072,051 filed on Sept. 4, 1979.

While the photographic apparatus 10 embodying the present invention is illustrated as comprising camera 14 and console 12 in combination, it will be understood that the invention described herein is not restricted to such a combination but also may be used in other photographic apparatus wherein elements of an imaging system are moved relative to the center of a fixed object plane to make multiple exposures on a single film unit.

As most clearly shown in FIG. 2, the lens 32 is mounted with its optic axis in perpendicular relation to the film plane 34 which is defined by later-to-be-described film support members within camera 14. The object plane 36 of this optical system is defined in part by the top surface of glass 18 which supports a document to be copied in position for exposure. While the illustrated apparatus 10 has a folded optical path, between film plane 34 and object plane 36, defined by the mirrors 24 and 26 and lens 32, it will be appreciated that such a system is optically equivalent to the imaging system shown in FIG. 9.

Figure 9:
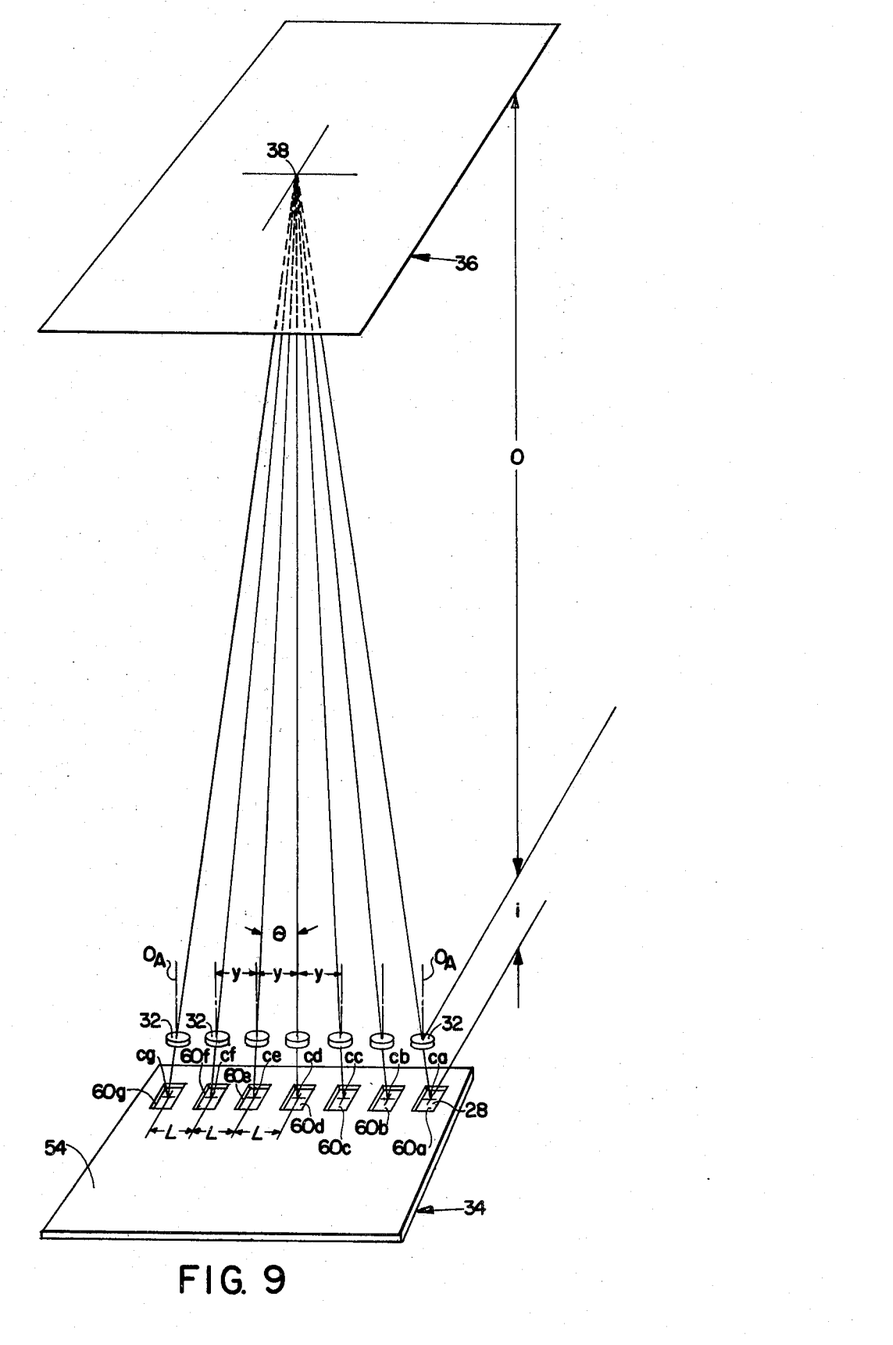
FIG. 9 is a diagrammatic perspective view of the imaging system utilized in the photographic apparatus.

That is, an observer at the film plane 34 looking through lens 32 would see the object plane 36 arranged in opposed spaced parallel relation to the film plane 34 with the object plane center 38 aligned with the center of the film plane 34. It becomes apparent, however, that as the lens 32 moves laterally away from the center of the film plane 34 to its other imaging positions, it becomes offset with respect to the object plane center 38. If an imaging area 28 is not directly aligned with the object plane center 38, and the lens 32 is directly aligned with the center of that image area, then the image projected by lens 32 of an object centered at the object plane 36 will be shifted laterally and therefore will not be centered with respect to the corresponding image area 28.

Before describing the structure of apparatus 10 that is utilized to automatically position the lens 32 in decentered relation to offset image areas 28 so that the image provided by the lens 32 is centered with respect thereto, the camera 14 will be described briefly to provide the background necessary to understand the present invention.

With reference to FIGS. 1-7, the camera 14 includes a generally box-like housing 40 defined by a hollow base housing section 42 and a forward wall housing section 44 closing the open top of base section 42. For ease of illustration, the camera 14 is shown with base section 42 at the bottom in FIGS. 3-7. However, it will be understood that camera 14 is mounted on console 12 with its forward wall 44 facing the camera mount 16 as shown in FIG. 2.

Figure 3:
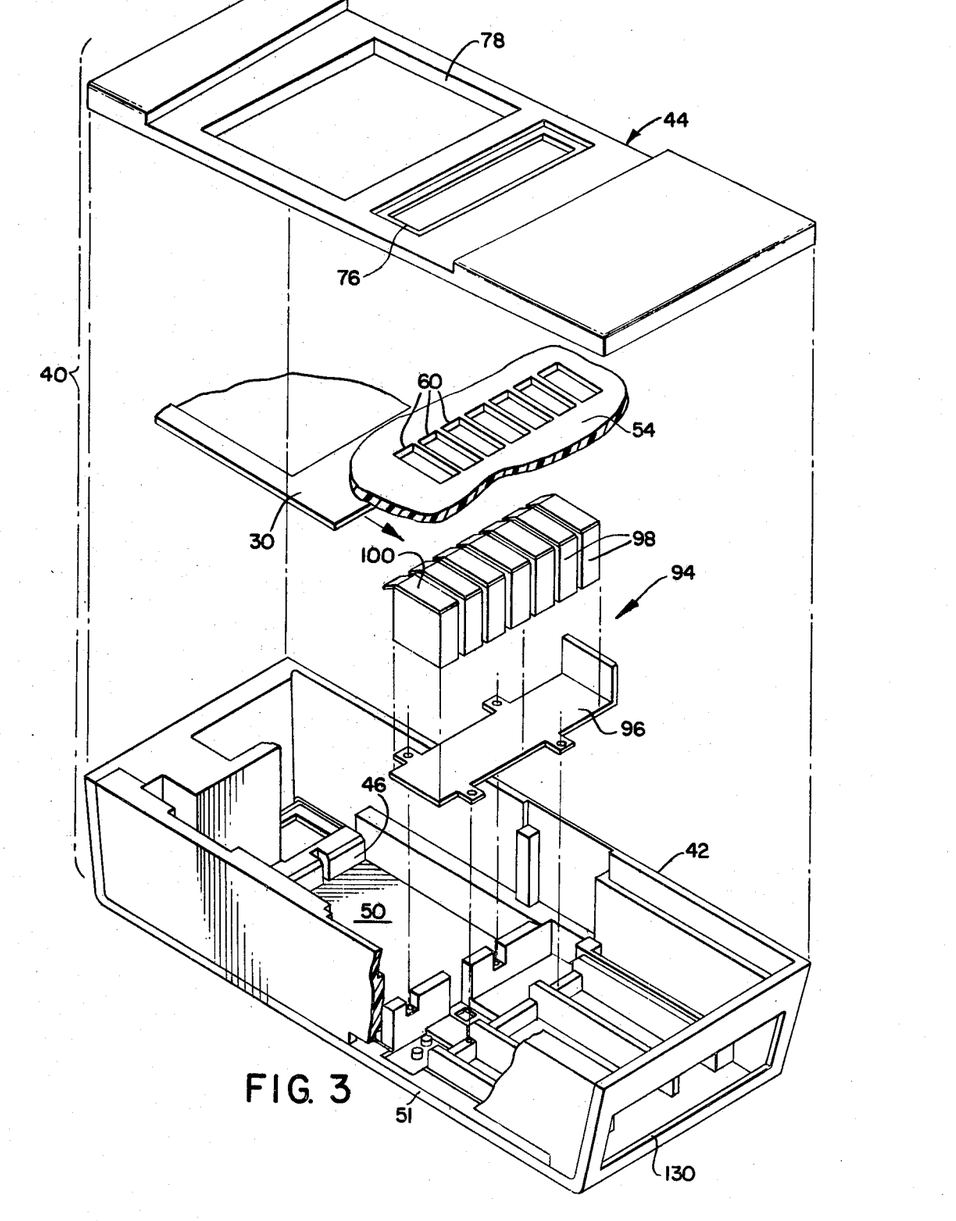
FIG. 3 is an exploded perspective view of selected camera components.
Figure 7:
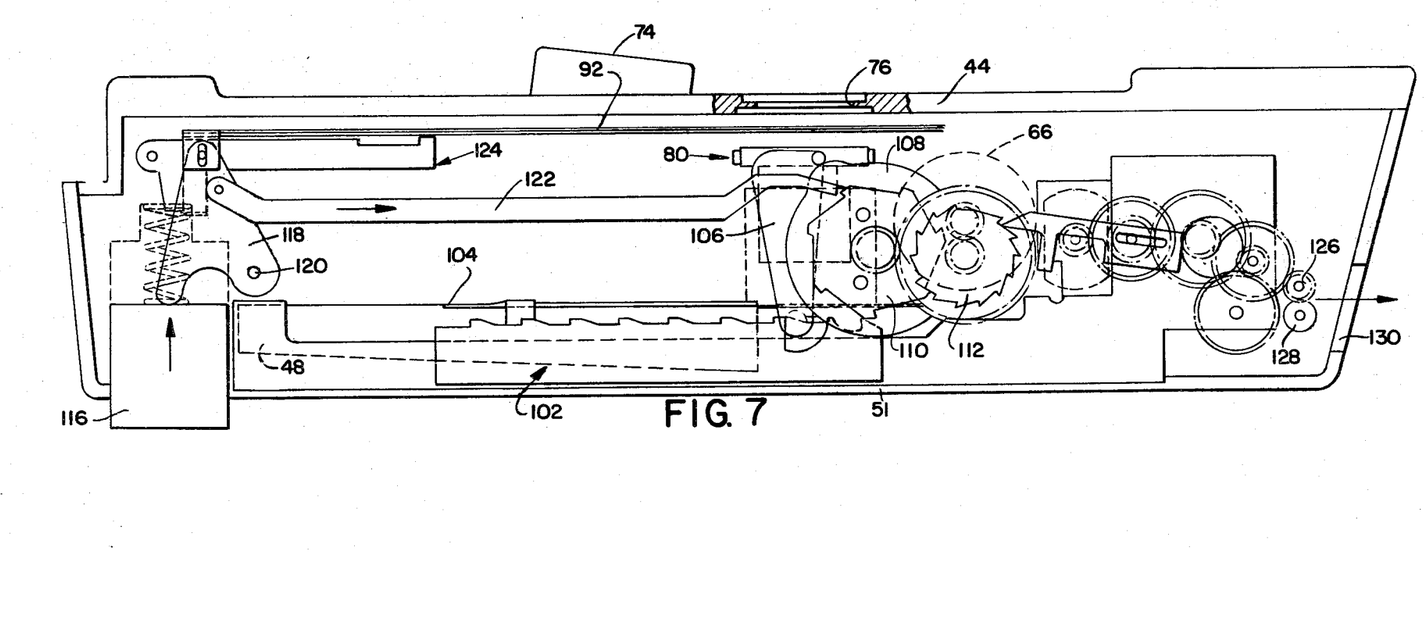
FIG. 7 is a side elevational view, partly in section, of the camera showing its actuating and drive mechanisms.

As best shown in FIG. 3, base section 42 includes a generally rectangular frame 46 for replaceably receiving a film container 48 holding a plurality of film units 30 therein in stacked relation (see FIG. 7). Access to frame 46 is provided by an access door 50 in the rear wall 51 of housing section 42.

Figure 4:
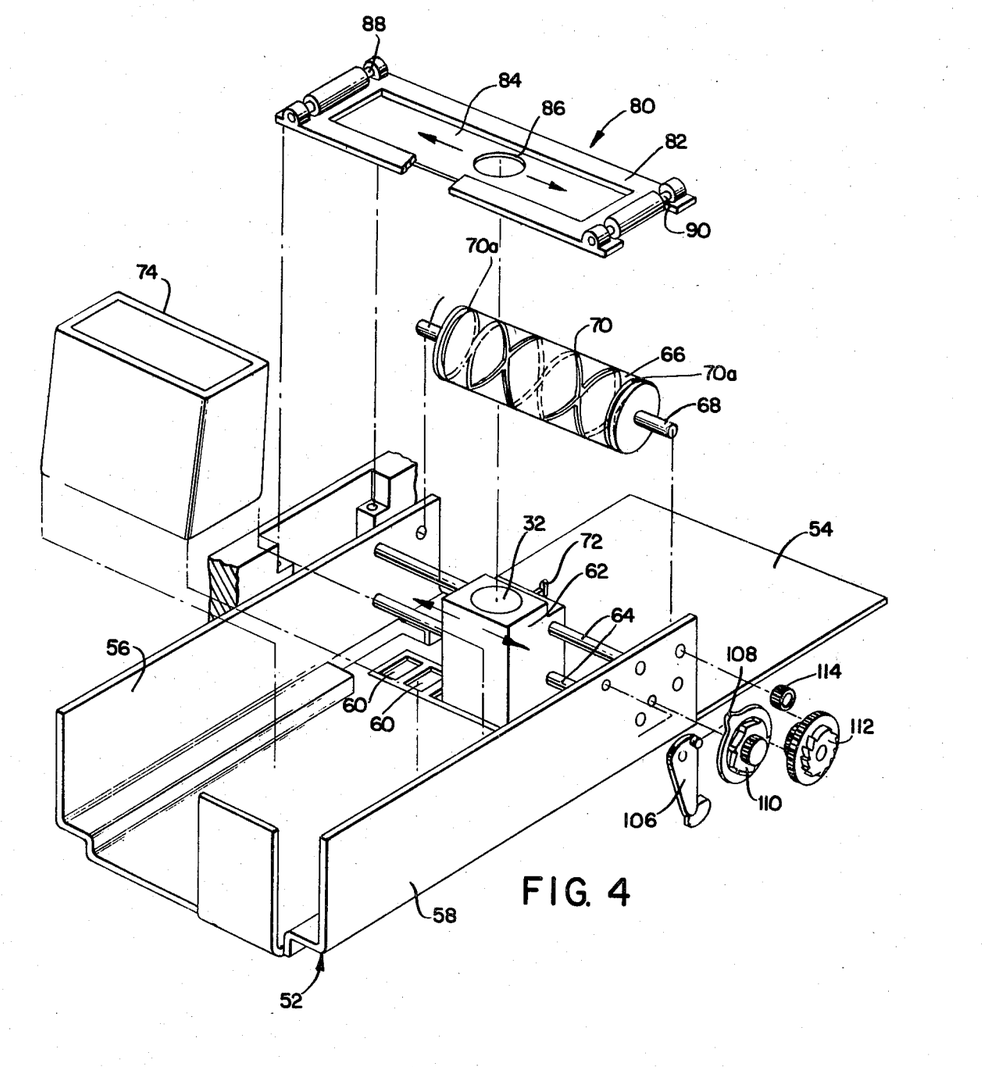
FIG. 4 is an exploded perspective view of certain components forming a camera subassembly.

As best shown in FIG. 4, the major components of camera 14 are mounted on a mounting frame 52 that fits into base section 42. Mounting frame 52 is preferably a sheet metal piece part defined by a generally planar bottom wall or base plate 54 and a pair of laterally spaced upturned side walls 56 and 58.

Located in base plate 54 are a plurality (seven) of generally rectangular equally spaced framing gate apertures 60 disposed in a laterally extending linear row and serving as gates, through which image forming light is transmitted, to define the image areas 28 on a portion of film unit 30 supported on the underside of base plate 54 in registration with apertures 60. Thus the underside of base plate 54 in cooperation with later-to-be-described film supporting structure serves as means for defining the camera film plane 34.

The objective lens 32 is carried by a block-like lens carriage 62 that is slidably mounted on guide rods 64, extending between side walls 56 and 58, for movement along a linear path of travel over the apertures 60 which allows the lens 32 to be located at successive imaging positions in imaging relation with each of the framing gate apertures 60 in the linear row.

Camera 14 also includes means for automatically advancing the lens 32 along its path of travel in predetermined increments. These advancing means include a barrel cam 66 having the opposite ends of its fixed axial shaft 68 rotatably mounted in side walls 56 and 58 and a double helix cam groove 70 formed in its cylindrical exterior surface; and a cam follower pin 72 formed on lens carriage 62 and which extends into and rides along groove 70. The manner in which the rotatable barrel cam 66 operates to reciprocally advance lens 32 relative to the framing gate apertures 60 will be discussed in detail later.

Also mounted on frame 52, on the opposite side of carriage 62 from cam 66, is an electronic strobe unit 74 which is operative to illuminate a document located on mounting glass 18.

Figure 5:
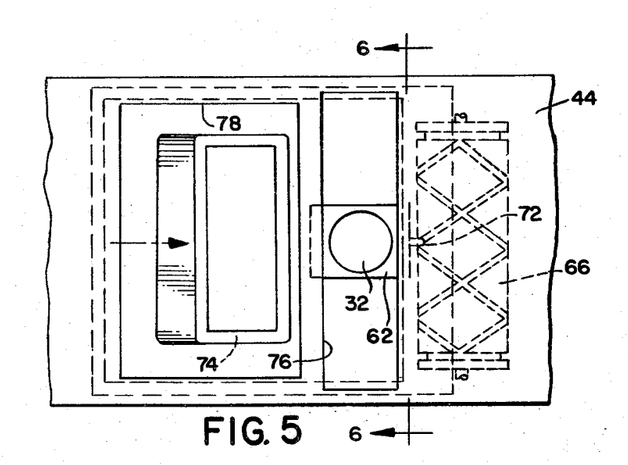
FIG. 5 is a fragmentary plan view of a front portion of the camera.

As best shown in FIGS. 3, 5 and 7, the forward wall section 44 of the camera housing is provided with an elongated rectangular lens aperture 76 which is aligned with the framing gate apertures 60 and the lateral path thereover of the lens 32; and a generally rectangular aperture 78 through which the top portion of strobe unit 74 protrudes slightly beyond the exterior face of wall section 44. It will be noted that the aperture 22 in the camera mount 16 of console 12 is sufficiently large so that both the lens aperture 76 and strobe aperture 78 are in facing relation therewith when camera 14 is operatively positioned in mount 16.

In order to limit the transmission of light passing through lens aperture 76 to a single gate 60 having lens 32 in imaging relation therewith, camera 14 is provided with a light shield assembly 80 that is secured to the opposite side walls of housing section 42 and extends over the path of travel of lens 32 behind lens aperture 76. The light shield includes a generally rectangular frame 82, a flexible light opaque apron 84 having an opening 86 therein and a pair of rollers 88 and 90 having the opposite ends of apron 84 secured thereto and on which the apron 84 is wound and unwound respectively thereby allowing the apron 84 to move laterally across frame 82. In a preferred embodiment, the apron 84 is secured to the top surface of carriage 62 with its aperture 86 aligned with lens 32. Thus the flexible apron 84 is moved automatically with the carriage 62. Image forming light transmitted through aperture 76 may only pass through aperture 86 and lens 32 so the apron 84 effectively blocks the light path to the framing gate apertures 60 which do not have the lens 32 in imaging relation therewith.

In addition to light shield assembly 80, the exposure means for effecting the transmission of image forming light through lens 32 to expose an image area 28 on the film unit 30 includes a shutter 92 located over light shield 80 behind the lens aperture 76 (see FIG. 7).

The shutter 92 comprises superposed opening and closing blades each having an aperture therein that is coextensive with the lens aperture 76. The blades are set normally with their respective apertures out of registration so that they block the lens aperture 76.

In response to the operation of a later-to-be-described actuating system, the blades are moved simultaneously to a cocked position and then return sequentially to first unblock aperture 76 to initiate the exposure interval and thereafter block aperture 76 to terminate exposure. While shutter 92 is open, strobe unit 74 is fired to illuminate a document on glass 18.

Figure 6:
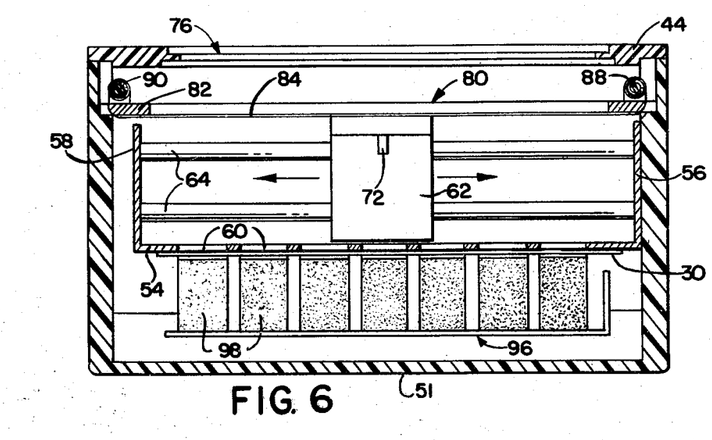
FIG. 6 is a cross-sectional view of the camera take along line 6—6 of FIG. 5.

As best shown in FIGS. 3 and 6, the film unit 30 is supported against the backside of base plate 54 in alignment with the framing gate aperture 60 by means of a support assembly 94 comprising a base flange 96, mounted at the bottom of housing section 42, and a linear array of seven resilient blocks 98 on flange 96, each having a low friction cap 100 thereon, for resiliently urging a lateral row defining portion of film unit 30 against the underside of the seven framing gate apertures 60.

After a row of image areas 28 has been exposed, the film unit is advanced longitudinally, one row position, to locate the next successive lateral portion of the film unit 30 in alignment with the row of framing gate apertures 60. The means for incrementally advancing the film unit 30 in the longitudinal direction includes an elongated pick slide 102, mounted in base housing section 42 for longitudinal movement therein, and a pick 104 mounted on the trailing end of pick slide 102 and configured to extend into a trailing end slot in film container 48 to engage and advance the forwardmost film unit 30 therein incrementally relative to the exposure position defined by the row of framing gate apertures 60.

With reference to FIGS. 4 and 7, the pick slide 102 is moved incrementally by the pivotal motion of a pick drive lever 106 that is pivotally mounted thereover on side wall 58 with its bottom portion in engagement with a top ratchet section of pick slide 102. The pick lever 106 is operated by a pick drive cam 108 that is secured a first ratchet wheel 110 for rotary movement therewith. The first ratchet wheel 110 is rotatably mounted on side wall 58 and has a gear thereon in mesh with a second ratchet wheel 112 rotatably mounted on side wall 58 adjacent the first wheel 110. Ratchet wheel 112 has a gear section on its inner hub which in turn is in mesh with a pinion gear 114 fixedly secured to the axial shaft 68 of barrel cam 66.

The ratchet wheels 110 and 112 in turn are operated by an actuator assembly including, as best shown in FIG. 7, a manually operated and spring-biased push button 116 that is coupled to a bell crank 118 pivoted on the inside of housing section 42 at pin 120. Pivotally coupled at one end to bell crank 118 is an elongated drive lever 122 having its opposite drive end in engagement with the first ratchet wheel 110. Also coupled to bell crank 118, at its upper end, is a shutter actuating assembly 124.

In operation, the user manually depresses button 116 to initiate a cycle of camera operation. The initial depression of button 116 pivots bell crank 118 in a clockwise direction about pin 120. This movement advances drive lever 122 to the right (as viewed in FIG. 7) causing it to rotate the first ratchet wheel 110 through one rotational increment in a clockwise direction. Through the gearing of wheel 110, wheel 112 and pinion gear 114, the barrel cam 66 is rotated through a predetermined arc of rotation causing it to advance the lens carriage 62 one position along the row of gate apertures 60 to locate lens 32 in imaging relation with the next successive image area 28 in the row. This initial pivoting of bell crank 118 also causes shutter actuator assembly 124 to move the blades of shutter 92 to the cocked position. In response to the mutual release of button 116, bell crank 118 pivots in a counterclockwise direction about pin 120 to release the shutter 92 and effect the exposure of an image area 28 and also return the drive lever 122 to its initial position.

Therefore, for each actuation of button 116 the lens carriage 62 is advanced one position to the next imaging position along the row and the shutter operates to effect exposure of the corresponding image area 28. It will be noted that the pick drive cam 108 makes one singe revolution during the course of each linear pass of the carriage 62 along the framing gate apertures 60 so that after the exposure of the last image area 28 in the row, the cam 108 actuates pick drive lever 106 causing the pick slide 102 to advance the film unit longitudinally one row position prior to making the next exposure. Also it should be noted that the barrel cam grooves 70 include dwell sections 70a at its opposite ends so that after the last exposure in the row and the incremental advance of the film unit 30, the lens carriage 62 remains at the end of the row position to begin the next row of exposures.

Following the last exposure, the pick slide 102 advances the film unit forwardly and into the bite of a pair of motor driven pressure applying rollers 126 and 128. As the film unit 30 advances therebetween the compressive pressure applied by the rollers 126 and 128 discharges a fluid processing composition from a pod 129 at the leading end of the film unit 30 and distributes the fluid between predetermined layers to initiate a well-known development process. As the film unit 30 leaves the exit side of the rollers it is advanced through an elongated film exit slot 130 to the exterior of camera housing 40.

For a more detailed description of camera 14 reference may be had to the previously-noted commonly assigned copending applications Ser. No. 071,940 (now U.S. Pat. No. 4,235,545) and 072,051 now U.S. Pat. No. 4,235,543, filed on Sept. 4, 1979.

The imaging system of apparatus 10 will now be described with referece to FIGS. 9–12.

In FIG. 9, camera structure in the form of that portion of mounting frame base plate 54 having the linear row of seven framing gate apertures 60 therein is shown to represent the film plane 34 (defined by the underside of plate 54) and the image areas 28 of the film unit (defined by the corresponding rectangular gate apertures 60). The framing gate apertures carry the sequential designations 60a –60g corresponding to the image area column designations in FIG. 8.

The geometrical center of each of the image areas 28 is defined by the geometrical center of the corresponding framing gate aperture 60. The centers of both the apertures 60 and image areas 28 are designated ca-cg. It will be noted that the framing gate apertures 60 are of equal size and are spaced equally in the lateral direction. The lateral spacing, designated L, is measured between the centers of adjacent apertures 60.

The object plane 36 is shown arranged in opposed parallel relation to the film plane 34 at a fixed predetermined distance therefrom. For the purpose of this analysis, it will be assumed that the geometrical center of the film plane 34 corresponds to the center cd of the middle framing gate aperture 60d in the row. The object plane 36 is arranged so that its center 38 is in direct alignment with the center of the film plane 34 defined by cd. That is, a construction line passing through object plane center 38 and aperture center cd is mutually perpendicular to the object plane 36 and the film plane 34.

The lens 32 includes an optic axis OA and front and rear nodal points (not shown). Lens 32 is disposed between the object plane 36 and the film plane 34 with its optic axis mutually perpendicular thereto for lateral movement along its path of travel over the framing gate apertures 60. The lens 32 is supported at a fixed distance from both the object plane 36 and the film plane 34. The distance from lens 32 to object plane 36 carries the designation O. The distance from lens 32 to the film or image plane 34 carries the designation i.

As noted earlier, the imaging system shown in FIG. 9 is the optical equivalent of the folded optical path imaging system of apparatus 10 shown in FIG. 2. That is, an observer at the film plane 34 looking through lens 32 would see the object plane 36 at an apparent location in opposed relation thereto as shown in FIG. 9.

The optical characteristics of such an imaging system will be described with reference to FIGS. 10-12. It should be noted that in these diagrammatic representations of the imaging system, the relative size of the object plane 36, the gate apertures 60 and the spacing therebetween is grossly exaggerated for the sake of clear illustration. Because of this, not all of the framing gate apertures 60 in the row will be shown in these figures.

When lens 32 is centered over the middle gate aperture 60d, its optic axis OA is aligned with both the object plane center 38 and the image area center cd. Therefore, an image formed by lens 32 of a document centered on document support glass 18 will be centered with respect to the corresponding image area 28 defined by the middle gate aperture 60d. In this instance, the field of view of lens 32 is symmetrically disposed with respect to the object plane center 38 and covers the entire document supported on glass 18.

In the illustrated photographic apparatus 10, the distance from the object plane 36 to the film plane 34 is approximately 18.5 inches. Lens 32 is selected to provide a 25:1 reduction and typically will have a focal length of 17 millimeters.

Figure 10:
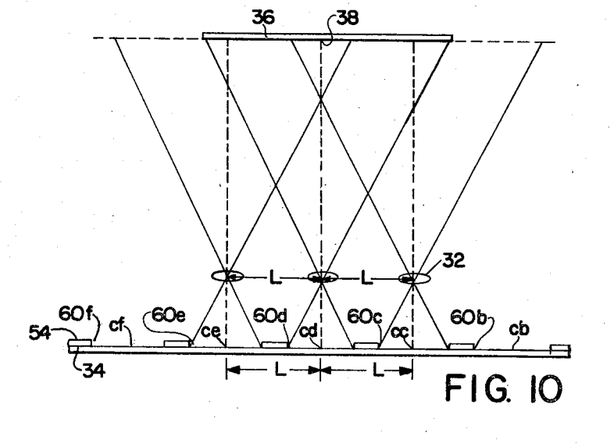
FIG. 10 is a graphical representation showing how the field of view of the camera lens shifts relative to the object plane when the lens is centered with respect to an offset film image area.

In FIG. 10, the field of view of lens 32 is shown to cover the entire object plane 36 when the lens 32 is centered on gate aperture 60d. However, if the lens 32 is moved laterally so that its optic axis OA is aligned with the center cc of the next adjacent gate aperture 60c (or the center of any other gate aperture 60 in the row other than the middle gate aperture 60d), then the lens 32 is offset laterally with respect to the object plane center 38 thereby causing the field of view of the lens to be laterally offset accordingly so that it no longer covers the entire object plane 36. Under these conditions, the image formed by lens 32 at the corresponding image area 28 is offset laterally or is decentered with respect to that particular image area.

One way to center an image at the offset image area 28 is to tilt the lens 32 and the film plane at each offset image area 28 so that the lens field of view covers the entire object plane 36. This approach, however, is undesirable because one lateral edge of the tilted film plane at an offset image area 28 will be closer to the document than the opposite lateral edge thereby providing unequal magnification across the field of view which will result in perspective distortion.

In order to eliminate such perspective distortion, the film plane 34 must be substantially parallel to the object plane 36. The imaging system of the present invention maintains this parallel relationship and compensates for the lateral shift of the image formed by lens 32 by proportionally offsetting the lens 32 with respect to its corresponding image area center at those image areas 28 (framing gate apertures 60) where the image area center is not directly aligned with the object plane center.

More specifically, photographic apparatus 10 is provided with means for automatically advancing the lens 32 along its path of travel in increments which locate lens 32 at successive imaging positions whereat the lens 32 is offset from the center of each respective image area, not directly aligned with the object plane center 38, by a sufficient amount so that an image formed by lens 32 of an object centered at object plane 36 is centered with respect to each nonaligned image area as well as an aligned image area. The lens advancing means includes the barrel cam 66 which has its double helix groove 70 configured to move the carriage 62 and the lens 32 therein in predetermined increments which may be best explained with reference to FIGS. 11 and 12.

Figure 11:
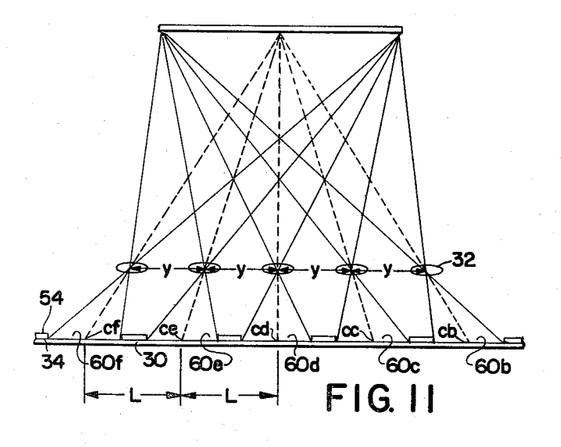
FIG. 11 is a graphical representation showing the placement of the camera lens with respect to the object plane center and the center of corresponding image areas wherein the center of at least one of the image areas is directly aligned with the object plane center.

FIG. 11 is intended to diagrammatically represent a portion of the imaging system shown in FIG. 9. Because the scale is grossly exaggerated, only five of the seven gate apertures 60 are shown. It does, however, represent an imaging system having an odd number of equally spaced gate apertures 60 in the row with the middle gate 60d having its geometrical center cd directly aligned with the object plane center 38.

When the lens 32 is centered with its optic axis OA on a line extending between object plane center 38 and gate aperture center cd, the field of view of lens 32 covers the entire object plane 36 and the resultant image at the film plane 34 is centered with respect to middle gate aperture 60d and the corresponding middle image area 28 which aperture 60d defines.

In order to locate lens 32 at the next successive imaging position in imaging relation to the next image area 28 defined by framing gate aperture 60e, the lens 32 is moved to the left (as viewed in FIG. 11) by a distance y which is smaller than the distance L between the centers of the adjacent gate apertures 60. In this manner, the lens 32 is laterally offset to the left with respect to object plane center 38 and is also laterally offset, to the right, with respect to the center ce of the image area 28 defined by framing gate aperture 60e. By shifting the lens relative to the center ce of the image area 28 defined by aperture 60e, the image projected by lens 32 is shifted laterally so as to center it with respect to the corresponding image area 28. In other words, by laterally offsetting the lens 32 to the right of the image area center ce, the field of view of lens 32 is shifted to the right so that it covers the entire object plane 36 and the projected image is likewise shifted to the right to center it with respect to the corresponding image area 28.

When the lens 32 is set at its proper imaging position with respect to an offset image area 28, it will be found that the rear nodal point of lens 32 lies on a direct line extending between the object plane center 38 and the corresponding center of the image area 28 such as the center ce.

By shifting lens 32 another increment y to the left (as viewed in FIG. 11), from its imaging position with respect to framing gate aperture 60e, the lens 32 will be automatically located at its correct imaging position with respect to the center cf of the next image area 28 defined by gate aperture 60f. That is, by moving the lens 32 by an additional incremental distance y, the rear nodal point of lens 32 will be found to lie on a straight line drawn between object plane center 38 and the next image area center cf.

Because the incremental distance y is smaller than the center-to-center spacing L between centers of adjacent image area 28, the distance that the lens 32 is offset from its corresponding image area center increases in direct proportion to the degree with which an image area 28 is offset laterally with respect to the object plane center 38.

With reference to FIG. 9 it will be seen that y and L form corresponding sides of similar triangles so that:

$$\tan \theta = \frac{y}{O} = \frac{L}{O+i}$$
$$y = \frac{LO}{O+i}$$

where y is the lateral distance between adjacent lens imaging positions; L is the lateral distance between centers of adjacent gate apertures 60 and the corresponding image areas 28 defined thereby; O is the perpendicular distance from object plane 36 to lens 32 and i is the perpendicular distance from lens 32 to the film plane 34. Because the quantities L, O and i are known constants designed into any particular imaging system, the distance y may be calculated easily.

Thus, in an imaging system such as the one shown in FIGS. 9 and 11, where there are an odd number of gate apertures 60 in the row and the middle gate aperture 60d has its center cd in direct alignment with the center 38 of object plane 36, the lens 32 will be directly aligned with the center cd of the middle image area 28 defined by gate aperture 60d. At the other gate apertures 60 in the row that have their centers laterally offset with respect to the center 38 of object plane 36, the lens will be proportionally offset with respect to the corresponding image area centers to accurately locate lens 32 in correct imaging relation therewith. However, at all imaging positions along the row, the rear nodal point of lens 32 will lie on a direct line extending between the object plane center 38 and the center of a corresponding one of the image areas 28.

Figure 12:
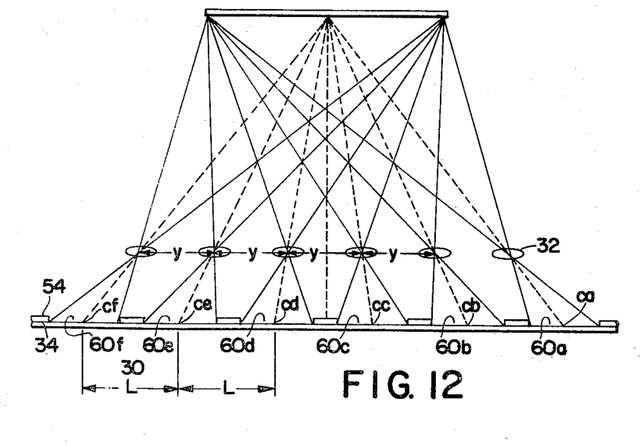
FIG. 12 is a graphical representation that is similar in some respects to FIG. 11 but shows the lens placement when all of the image areas are offset with respect to the object plane center.

FIG. 12 shows an alternative layout for the framing gate apertures 60 which are configured to define an even number of corresponding image areas 28 in the row. In this case, none of the image areas 28 defined by the gate apertures 60 have their centers in direct alignment with the object plane center 38. However, this arrangement does not change the principles enumerated above for decentering the lens 32 with respect to the centers of the corresponding image areas 28 so that the image of an object centered at object plane 36 is centered with respect to a corresponding one of the image areas 28. The same relationships apply. That is, at each of the imaging positions of lens 32 along its path of travel, its rear nodal point will lie on a direct line connecting object plane center 38 with the center of a corresponding one of the image areas 28.

Furthermore, the same relationships apply to any row of equally spaced image areas 28. That is to say, there is not constraint that dictates that the row of image areas 28 has to be symmetrically disposed with respect to the object plane center 38.

In a preferred embodiment of the present invention, the lens 32 may be automatically advanced to the sequential imaging positions required for proper imaging relation by configuring the double helix groove 70 in barrel cam 68 to move the lens carriage 62 in the required increments relative to the framing gate apertures 60. In any imaging system where the gate apertures 60 define equally spaced image areas 28 on the film unit 30, the grooves 70 are configured to move the carriage 62 in equal increments that are less than the center-to-center spacing between adjacent image areas 28 defined by the gate apertures 60. If, for some reason, there is an application where the gate apertures 60 are not equally spaced, grooves 70 may still be configured to locate the rear nodal point on a direct line between the object plane center and the center of a corresponding image area 28. But in this instance, the incremental steps may not be equal and, of course, the grooves 70 and cam 66 would be more complex in shape to accomplish this function in the manner set forth above.

While the illustrated photographic apparatus 10 has utilized a barrel cam to automatically move lens 32 to sequential preferred imaging positions of the type described, it is within the scope of the present invention to provide other types of mechanisms for incrementally moving the lens as disclosed without departing from the scope of the present invention.

Because certain other changes may be made in the above photographic apparatus without departing from the scope of the invention herein involved, it is intended that all matter contained in the above description or shown in the accompanying drawings shall be interpreted as illustrative and not in a limiting sense.

What is claimed is:

1. Photographic apparatus for sequentially exposing a plurality of image areas on a single card-like film unit in response to successive operating cycles of said apparatus, said apparatus comprising:

means for supporting such a film unit at a film plane;

means for defining an object plane having a center and being optically arranged in opposed spaced parallel relation to said film plane;

means for defining a plurality of fixed separate equal sized image areas arranged with equal spacing between centers thereof in a linear row on the film unit at said film plane;

a lens for forming an image at said film plane of an object located at said object plane;

means for mounting said lens for movement relative to said object plane center and said row of image areas along a path of travel with the optic axis of said lens mutually optically perpendicular to said object plane and said film plane;

exposure means operative during each operating cycle of said apparatus for effecting passage of image forming light through said lens to expose an image area; and means responsive to successive operating cycles of said apparatus for automatically advancing said lens along said path of travel in increments which locate said lens at successive imaging positions whereat said lens is offset from the center of each respective image area, not directly aligned with said object plane center, by a distance so that the rear nodal point of said lens lies on a direct line extending between said object plane center and the center of a corresponding one of said image areas whereby an image formed by said lens of an object centered at said object plane is centered with respect to each corresponding nonaligned image area as well as a corresponding aligned image area.

2. The apparatus of claim 1 wherein the distance said lens is offset from a corresponding image area center varies in direct proportion to the distance said corresponding image area center is offset from said object plane center.

3. The apparatus of claim 1 wherein at least one of said image areas in said row has its center in optical alignment with said object plane center, at said imaging position corresponding to said one image area said lens is centered with respect to said one image area and at the other imaging positions said lens is offset with respect to the centers of the corresponding image areas.

4. The apparatus of claim 1 wherein the incremental distance between adjacent imaging positions is less than the spacing between centers of adjacent image areas.

5. The apparatus of claim 1 wherein said lens advancing means includes a rotatable cam and a follower for coupling said lens to said cam in cam follower relation and said cam is configured to advance said lens in equal increments that are smaller than the spacing between centers of adjacent image areas.

6. The apparatus of claim 5 wherein one of said image areas in said row has its center optically aligned with said object plane center and said cam is configured to align said lens with said center of said one image area when said lens is located in the corresponding image position.

7. The apparatus of claim 6 wherein said cam is configured to locate said lens in offset relation with the centers of the other image areas at the respective imaging positions.

8. The apparatus of claim 7 wherein the distance said lens is offset from an image area center increases in proportion to the distance said image area center is offset with respect to said object plane center.

* * * * *